(12) United States Patent
Mizukami et al.

(10) Patent No.: US 7,043,996 B2
(45) Date of Patent: May 16, 2006

(54) STRAIN SENSOR AND PRODUCTION METHOD THEREFOR

(75) Inventors: Yukio Mizukami, Fukui (JP); Hiroaki Ishida, Fukui (JP); Toshiro Otobe, Sakai-gun (JP); Keiichi Nakao, Hirakata (JP)

(73) Assignee: Matsushita Electric Industrial Co., Inc., Osaka (JP)

( * ) Notice: Subject to any disclaimer, the term of this patent is extended or adjusted under 35 U.S.C. 154(b) by 86 days.

(21) Appl. No.: 10/488,966

(22) PCT Filed: Sep. 17, 2002

(86) PCT No.: PCT/JP02/09499

§ 371 (c)(1),
(2), (4) Date: Apr. 20, 2004

(87) PCT Pub. No.: WO03/025532

PCT Pub. Date: Mar. 27, 2003

(65) Prior Publication Data

US 2004/0216529 A1 Nov. 4, 2004

(30) Foreign Application Priority Data

Sep. 17, 2001 (JP) .............................. 2001-281417

(51) Int. Cl.
*G01B 7/16* (2006.01)

(52) U.S. Cl. ....................................................... 73/777

(58) Field of Classification Search ................... 73/777
See application file for complete search history.

(56) References Cited

U.S. PATENT DOCUMENTS 5,869,175 A * 2/1999 Sardella ...................... 430/319
6,345,543 B1 * 2/2002 Aoki ....................... 73/862.474

FOREIGN PATENT DOCUMENTS

| JP | 55-2971 | 1/1980 |
|---|---|---|
| JP | 2-13803 | 1/1990 |
| JP | 10-27704 | 1/1998 |
| JP | 2000-180255 | 6/2000 |
| JP | 2000-292283 | 10/2000 |
| JP | 2002-202210 | 7/2002 |

* cited by examiner

*Primary Examiner*—Edward Lefkowitz
*Assistant Examiner*—Linda Field
(74) *Attorney, Agent, or Firm*—Steptoe & Johnson LLP (57) ABSTRACT

A strain sensor includes a metal plate, a first glass layer on the metal plate, a second glass layer provided on the first glass layer and having a color different from that of the first glass layer, an electrode on the second glass layer, a strain-sensitive resistor on the second glass layer, a circuit pattern on the second glass layer for connecting the electrode to the strain-sensitive resistor, and an overcoat glass layer for covering the strain-sensitive resistor and the circuit pattern. The strain sensor allows the layers to be identified while being manufactured, hence being controlled easily in its manufacturing processes.

9 Claims, 6 Drawing Sheets

Thickness of Glass Layer (μm)

STRAIN SENSOR AND PRODUCTION METHOD THEREFOR

TECHNICAL FIELD

The present invention relates to a strain sensor including a strain-sensitive resistor mounted to a metal plate, for detecting a strain produced by an external stress deriving from the weight of a human body or a vehicle, such as an automobile.

BACKGROUND ART

A convention strain sensor disclosed in Japanese Patent Laid-Open Publication No. 2000-180255 includes a glass layer and an over-glass layer.

The conventional strain sensor will be explained referring to the relevant drawings.

Figure 7:
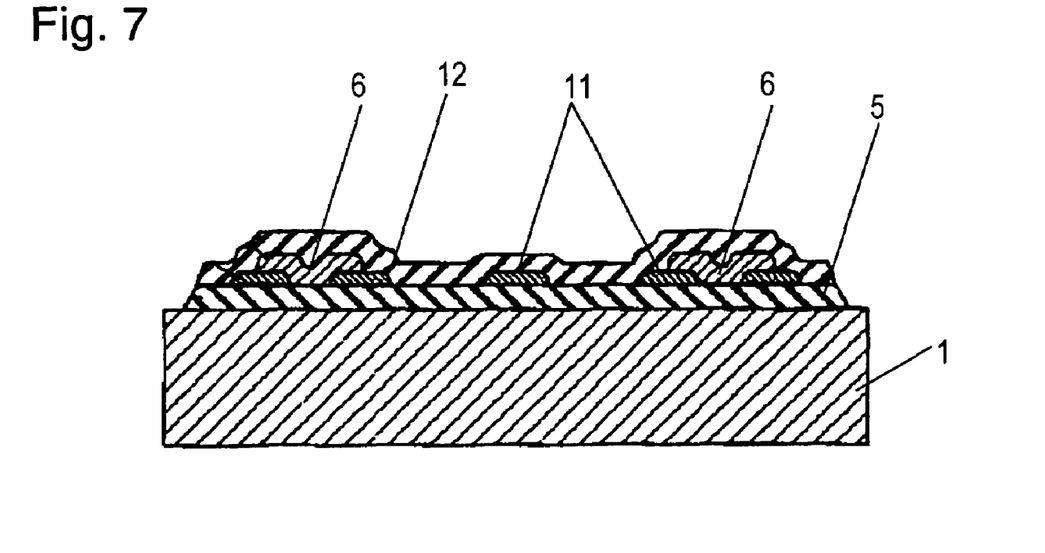
FIG. 7 is a side cross sectional view of a conventional strain sensor.
Figure 8:
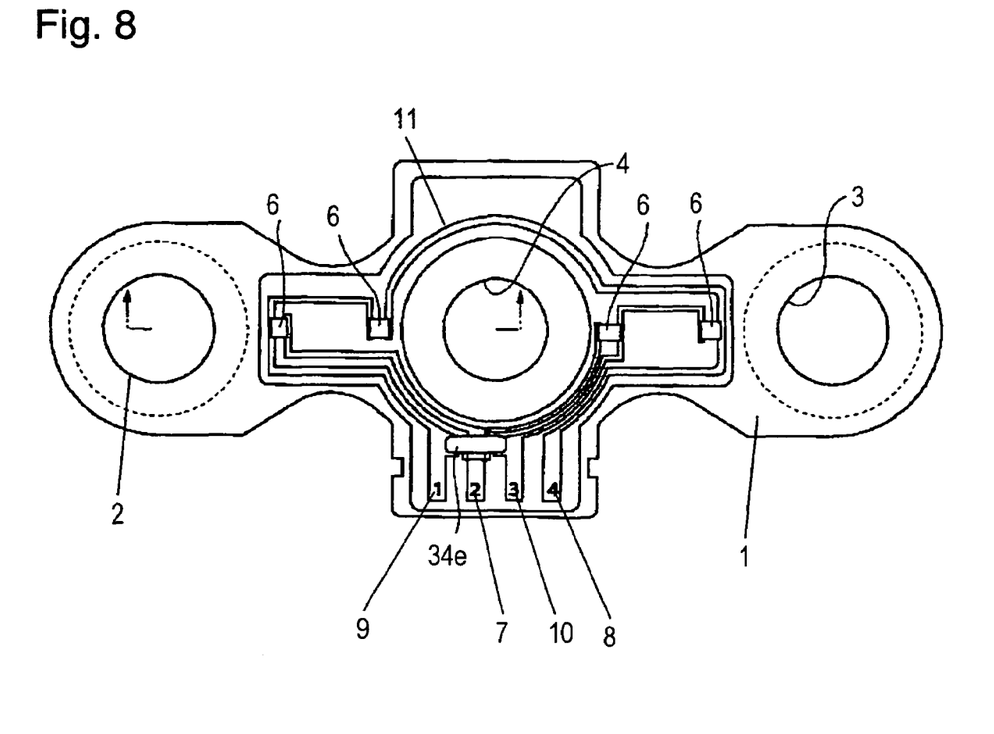
FIG. 8 is an upper view of the conventional strain sensor.

FIG. 7 is a side cross-sectional view of the conventional strain sensor, and FIG. 8 is a top view of the sensor. A metal plate 1 has a first fixing aperture 2 provided in one end region thereof, a second fixing aperture 3 provided in the other end region thereof, and a detecting aperture 4 provided in substantially the center region thereof. A glass layer 5 is provided on an upper surface of the metal plate 1 and four strain-sensitive resistors 6 provided on the upper surface of the glass layer 5. The strain-sensitive resistors 6 are electrically connected with a source electrode 7, a GND electrode 8, a first output electrode 9, a second output electrode 10, and a circuit pattern 11, thus constituting a bridge circuit. An overcoat glass layer 12 is provided on the strain-sensitive resistor 6, the circuit pattern 11, and the glass layer other than the source electrode 7, the GND electrode 8, the first output electrode 9, and the second output electrode 10.

A procedure of manufacturing the conventional strain sensor will be explained below.

First, glass paste is applied on the upper surface of the metal plate 1 by screen printing and is baked at about 850° C. to form the glass layer 5 on the upper surface of the metal plate 1.

Then, mixture paste including Ag and Pt is applied on an upper surface of the glass layer 5 by screen printing and is baked at about 850° C. to form the source electrode 7, the GND electrode 8, the first output electrode 9, the second output electrode 10, and the circuit pattern 11 on the upper surface of the glass layer 5.

Then, resister paste including Ru is provided between a portion of the glass layer 5 and a portion of the circuit pattern 11 and is baked at about 850° C. to form the strain-sensitive resistors 6 on upper surfaces of the glass layer 5 and the circuit pattern 11.

Finally, glass paste is applied by screen printing on upper surfaces of the strain-sensitive resistors 6, the circuit pattern 11, and the glass layer 5 other than the source electrode 7, the GND electrode 8, the first output electrode 9, and the second output electrode 10, and is baked at about 850° C. to form the overcoat glass layer 12 on the upper surfaces of the glass layer 5, the strain-sensitive resistor 6, and the circuit pattern 11.

An operation of the conventional strain sensor having the foregoing arrangement will be explained.

The metal plate 1 is fixed to a stationary base (not shown) with a bolt (not shown) which extends through the first fixing aperture 2 and the second fixing aperture 3 and is tightened with a nut (not shown). Then, a detecting member (not shown) is fixed at a detecting aperture 4. When the detecting member (not shown) is pressed from its upper by an external force F, the force deforms the metal plate 1, and the strain-sensitive resistors 6 on the metal plate 1 receives a stress or tension and have their resistances vary. The strain-sensitive resistors 6 and the circuit pattern 11 form the bridge circuit and are supplied with a voltage from the source electrode 7. Therefore, a difference between respective potentials at the first output electrode 9 and the second output electrode 10 is detected as a differential voltage, which has the external force F applied to the detecting member (not shown) be measured. In the conventional strain sensor, if pinholes are formed in the glass layer 5 and the overcoat glass layer 12, the pinholes allow water to reach the metal plate 1 and to disturb electrical insulation over the metal plate 1. For maintaining electrical insulation to the metal plate 1, plural glass layers 5 and overcoat glass layers 12 are provided.

However, the plural glass layers 5 and the overcoat glass layers 12 provided in the conventional strain sensor they may be hardly distinguished from each other, upper and lower, adjacent layers. The glass layers can be hardly identified, thus causing the manufacturing of the sensor not to be controlled easily.

SUMMARY OF THE INVENTION

A strain sensor includes a metal plate, a first glass layer on the metal plate, a second glass layer provided on the first glass layer and having a color different from that of the first glass layer, an electrode on the second glass layer, a strain-sensitive resistor on the second glass layer, a circuit pattern on the second glass layer for connecting the electrode to the strain-sensitive resistor, and an overcoat glass layer for covering the strain-sensitive resistor and the circuit pattern.

The strain sensor allows the layers to be identified while being manufactured, hence being controlled easily in its manufacturing processes.

DETAIL DESCRIPTION OF THE PREFERRED EMBODIMENT

Figure 1:
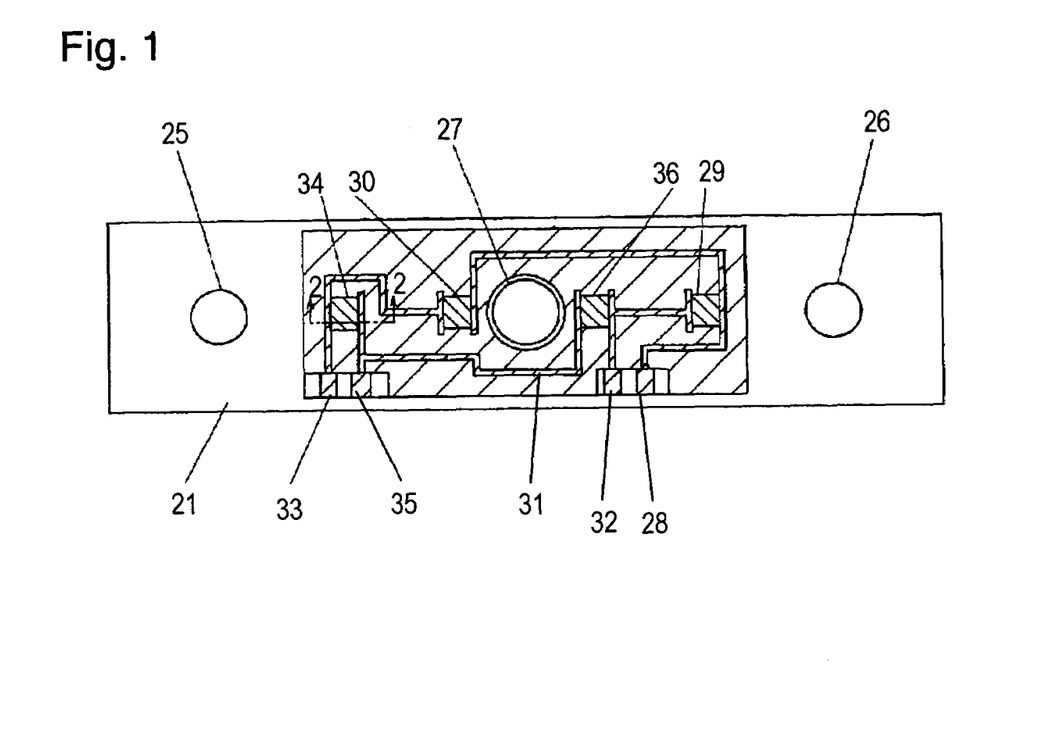
FIG. 1 is an upper view of a strain sensor according to an exemplary embodiment of the present invention.
Figure 2:
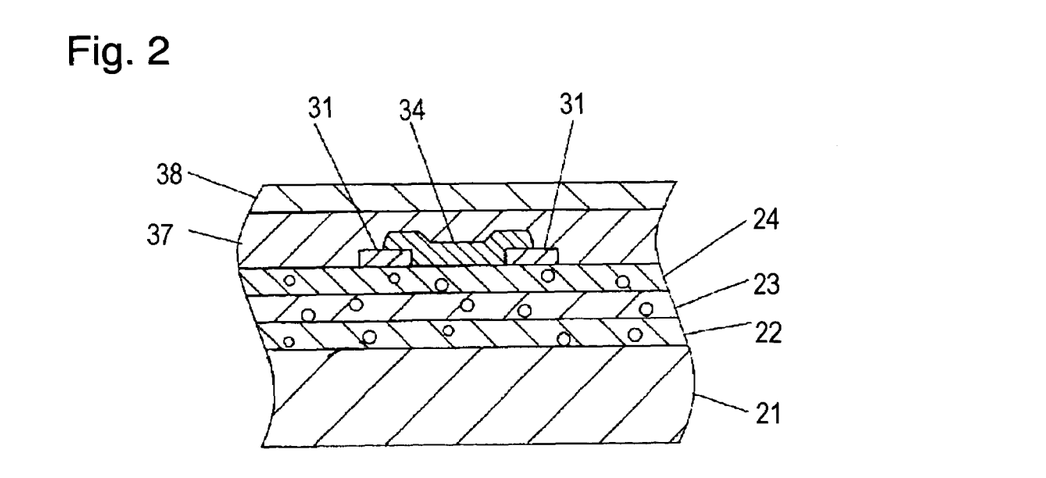
FIG. 2 is a side cross-sectional view of the strain sensor of the embodiment.

FIG. 1 is a top view of a strain sensor according to an exemplary embodiment of the present invention, and FIG. 2 is a side cross-sectional view of the sensor taken along line 2—2 of FIG. 1. As shown in FIG. 2, a first glass layer 22 is provided on an upper surface of a metal plate 21, such as SUS stainless steel plate. The first glass layer 22 is made of material including mother glass material containing MgO, $SiO_2$, CaO, $HfO_2$, and $B_2O_3$. This material further includes Cr based pigment added in this mother glass. This pigment changes a color of this mother glass into green. A second glass layer 23 is provided on an upper surface of the first glass layer 22 made of material including mother glass containing MgO, $SiO_2$, CaO, $HfO_2$, and $B_2O_3$. This material further includes Co based pigment added in this mother glass. This pigment changes a color of this mother glass into blue. A glass layer 24 is provided on an upper surface of the second glass layer 23 made of material including mother glass containing MgO, $SiO_2$, CaO, $HfO_2$, and $B_2O_3$. This material further includes Cr based pigment added in this mother glass. This pigment changes a color of this mother glass into green. As shown in FIG. 1, the metal plate 21 has a first fixing aperture 25 provided in a lengthwise end thereof and extending from the upper surface to the lower surface of the plate. The plate has a second fixing aperture 26 provided in the other lengthwise end thereof and extending from the upper surface to the lower surface of the plate. A detecting aperture 27 is provided in substantially the center region between the first fixing aperture 25 and the second fixing aperture 26 and extends from the upper surface to the lower surface of the plate. A source electrode 28 is provided near an edge of the upper surface of the metal plate 21 and is electrically connected through a circuit pattern 31 to one end of a first strain-sensitive resistor 29 and one end of a second strain-sensitive resistor 30. The other end of the first strain-sensitive resistor 29 is electrically connected to a first output electrode 32. The other end of the second strain-sensitive resistor 30 is electrically connected to a second output electrode 33 and one end of a third strain-sensitive resistor 34. The other end of the third strain-sensitive resistor 34 is electrically connected to a GND electrode 35. A fourth strain-sensitive resistor 36 is provided on the upper surface of the metal plate 21 and has one end electrically connected to the other end of the first strain-sensitive resistor 29 and the first output electrode 32. The resistor 36 has the other end electrically connected to the GND electrode 35. That is, the first strain-sensitive resistor 29, the second strain-sensitive resistor 30, the third strain-sensitive resistor 34, the fourth strain-sensitive resistor 36, the source electrode 28, the first output electrode 32, the second output electrode 33, the GND electrode 35, and the circuit pattern 31 forms a bridge circuit. A first overcoat glass layer 37 covers the first strain-sensitive resistor 29, the second strain-sensitive resistor 30, the third strain-sensitive resistor 34, the fourth strain-sensitive resistor 36, the circuit pattern 31, and a portion of an upper surface of the third glass layer 24 excluding respective positions of the source electrode 28, the first output electrode 32, the second output electrode 33, and the GND electrode 35. The first overcoat glass layer 37 is made of material including overcoat mother glass including $PbO_3$ and $SiO_2$. This material further includes Cr based pigment for changing a color of the mother glass into green. The upper surface of the first overcoat glass layer 37 is covered with a second overcoat glass layer 38 made of material including overcoat mother glass including $PbO_3$ and $SiO_2$. This material further includes Co based pigment for changing a color of this mother glass into blue.

A procedure of manufacturing the strain sensor of the embodiment having the above arrangement will be described below.

First, the first metal plate 21 is punched to form the first fixing aperture 25, the second fixing aperture 26, and the detecting aperture 27 in the plate 21.

Figure 3A:
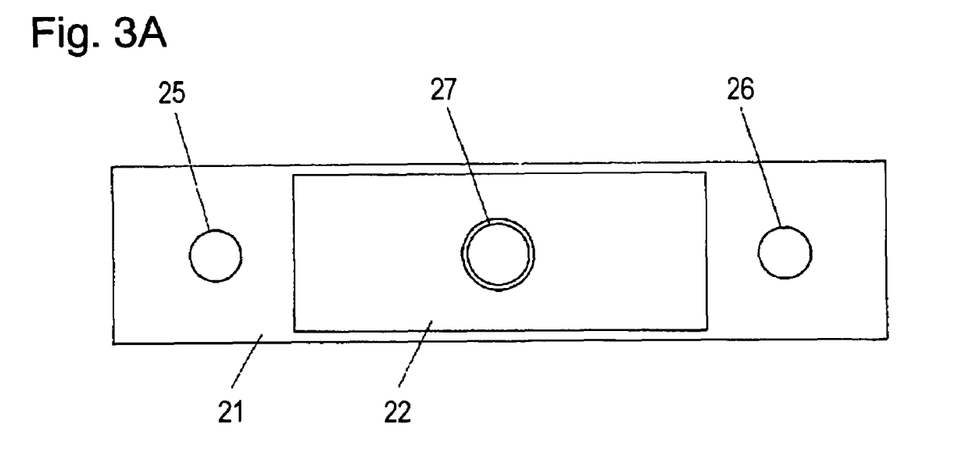
FIGS. 3A to 3C illustrate processes of manufacturing the strain sensor of the embodiment.

Then, first glass paste made of the material including the mother glass containing MgO, $SiO_2$, CaO, $HfO_2$, and $B_2O_3$, and the Cr based pigment is provided on the upper surface of the metal plate 21 by screen printing and is baked at about 850° C., thus providing the first glass layer 22, as shown in FIG. 3A.

Figure 3B:
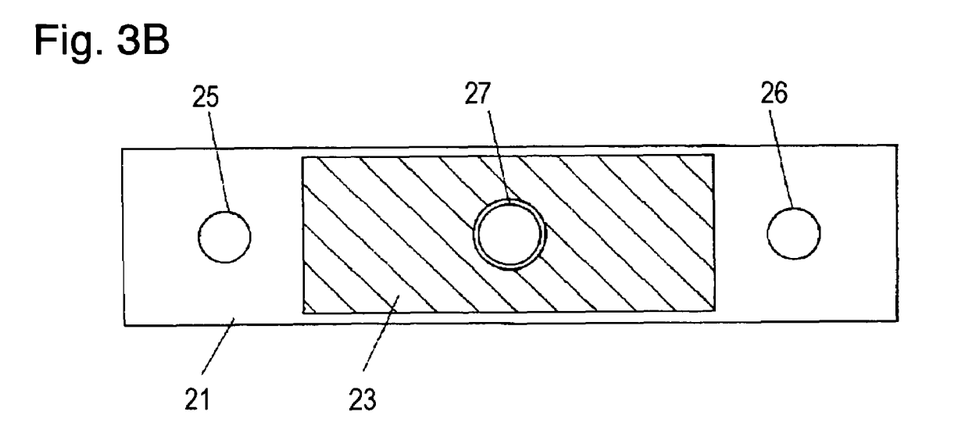

Then, second glass paste made of the material including the mother glass including MgO, $SiO_2$, CaO, $HfO_2$, and $B_2O_3$, and the Co based pigment is provided on the upper surface of the first glass layer 22 by screen printing and is baked at about 850° C., thus providing the second glass layer 23, as shown in FIG. 3B.

The first glass layer 22 is colored in green due to Cr, and the second glass layer 23 is colored in blue due to Co, thus allowing the layers distinguished from each other during the printing in the procedure of manufacturing the strain sensor. This allows the manufacturing of the strain sensor to be controlled easily.

The pigment of Cr and the pigment of Co which are different from each other are employed for tinting the first glass layer 22 in green and the second glass layer 23 in blue, respectively. The pigments change the colors of the glass layers 22 and 23. That is, the first glass layer 22 and the second glass layer 23 can easily varied in color.

Figure 3C:
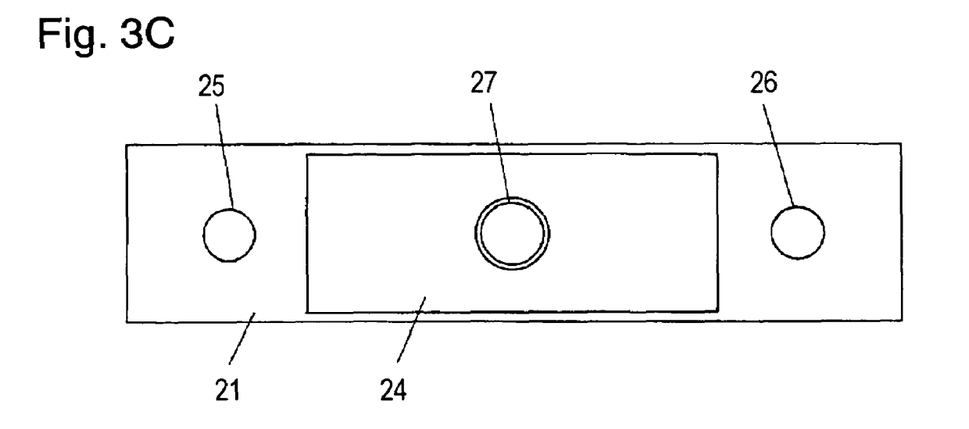

Then, the first glass paste is applied on the upper surface of the second glass layer 23 over the metal plate 21 by screen printing and is baked at about 850° C., thus providing the third glass layer 24, as shown in FIG. 3C.

Figure 4A:
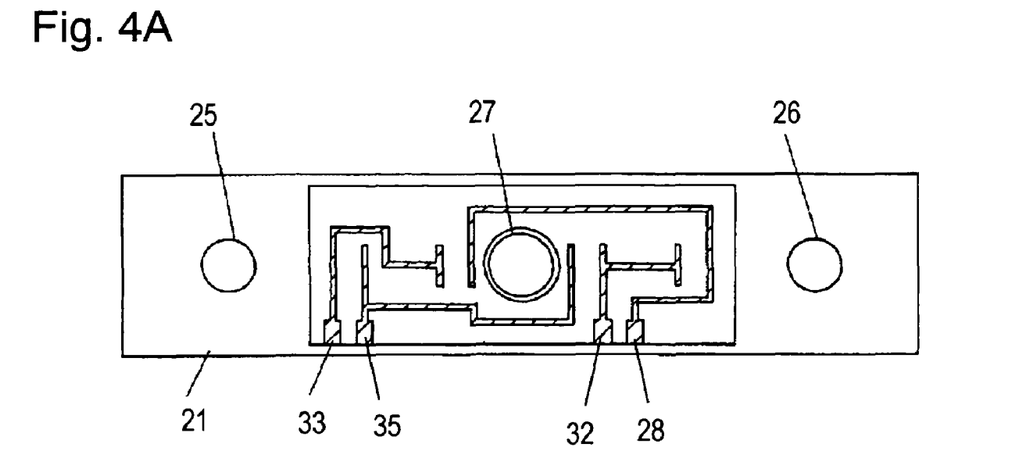
FIGS. 4A and 4B illustrate processes of manufacturing the strain sensor of the embodiment.

Then, paste of Ag is applied at respective positions of the source electrode 28, the first output electrode 32, the second output electrode 33, the GND electrode 35, and the circuit pattern 31, and is baked at about 850° C. for about 45 minutes, thus providing the source electrode 28, the first output electrode 32, the second output electrode 33, the GND electrode 35, and the circuit pattern 31, as shown in FIG. 4A.

Figure 4B:
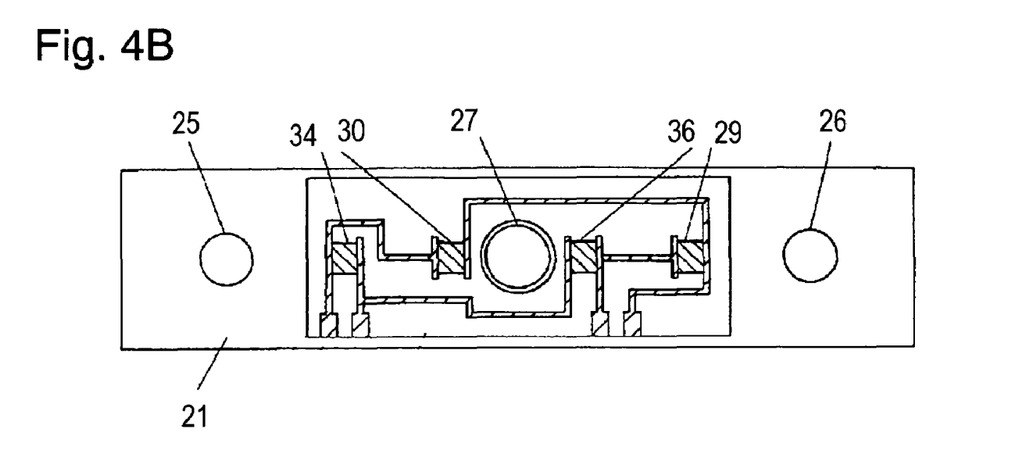

Then, metal-glazed carbon paste is applied on an upper surface of the metal plate 21 and is baked at about 850° C. for about 45 minutes thus providing the first strain-sensitive resistor 29, the second strain-sensitive resistor 30, the third strain-sensitive resistor 34, and the fourth strain-sensitive resistor 36, as shown in FIG. 4B.

Then, first overcoat glass paste of material including the overcoat mother glass containing $PbO_3$ and $SiO_2$, the pigment of Cr is applied by screen printing on the first strain-sensitive resistor 29, the second strain-sensitive resistor 30, the third strain-sensitive resistor 34, the fourth strain-sensitive resistor 36, the circuit pattern 31, and an upper surface of the third glass layer 24 excluding the source electrode 28, the first output electrode 32, the second output electrode 33, and the GND electrode 35. The applied paste is then baked at about 850° C., thus providing the first overcoat glass layer 37 over the third glass layer 24, the first strain-sensitive resistor 29, the second strain-sensitive resistor 30, the third strain-sensitive resistor 34, the fourth strain-sensitive resistor 36, and the circuit pattern 31.

Then, second overcoat glass carbon paste made of material of the overcoat mother glass containing $PbO_3$ and $SiO_2$, and the pigment of Co is applied by screen printing on the upper surface of the first overcoat glass layer 37, and is baked at about 850° C., thus providing the second overcoat glass layer 38 on the first overcoat glass layer 37.

A method of inspecting the thickness and the materials of the glass layers and the overcoat glass layers of the strain sensor of the embodiment will be described below.

Figure 5:
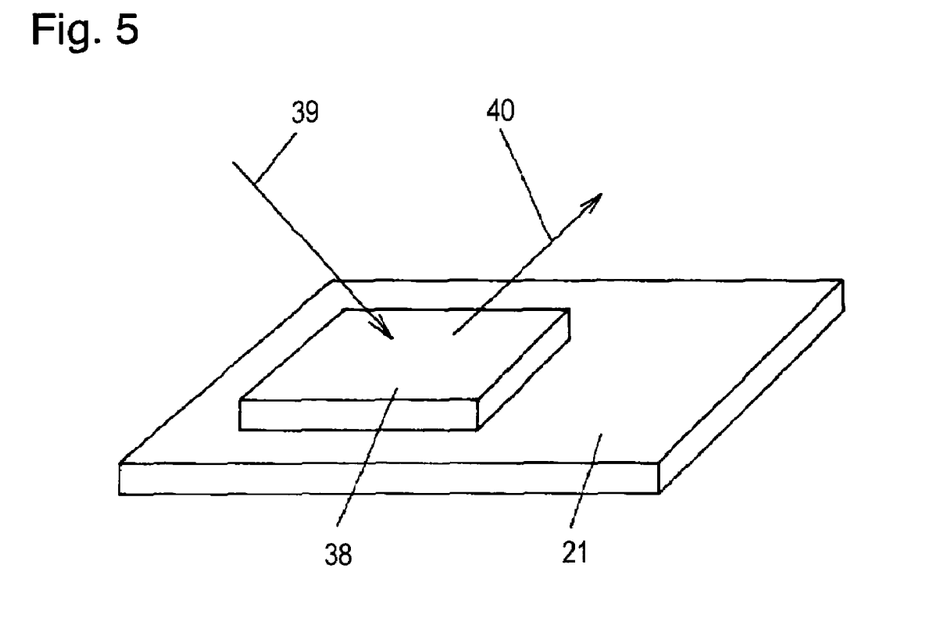
FIG. 5 is a perspective view of the strain sensor being tested of the embodiment.

As show in FIG. 5, upon fluorescent X-ray 39 is emitted from above the strain sensor towards the second overcoat glass layer 24, fluorescent X-ray 39 is reflected by the second overcoat glass layer 24. The first overcoat glass layer 37 and the second overcoat glass layer 38 since including Cr and Co, respectively. The difference allows the first glass layer 22, the second glass layer 23, the third glass layer 34, the first overcoat glass layer 37, and the second overcoat glass layer 38 to be analyzed in their material composition without physically cutting out in their cross sections but with examining the reflected fluorescent X-ray 40. For example, the fluorescent X-ray 39 is directed to the first glass layer 22 and the reflected X-ray 40 is measured in its intensity, thus providing a correlative profile of them shown in FIG. 6. As shown, the thicknesses of the first glass layer 22, the second glass layer 23, the third glass layer 24, the first overcoat glass layer 37, and the second overcoat glass layer 38 can be measured accurately from measurements of the intensity of the reflected fluorescent X-ray 40. The thicknesses of the first glass layer 22, the second glass layer 23, the third glass layer 24, the first overcoat glass layer 37, and the second overcoat glass layer 38 can be measured by measuring the reflected fluorescent X-ray 39 without destroying the layers.

Figure 6:
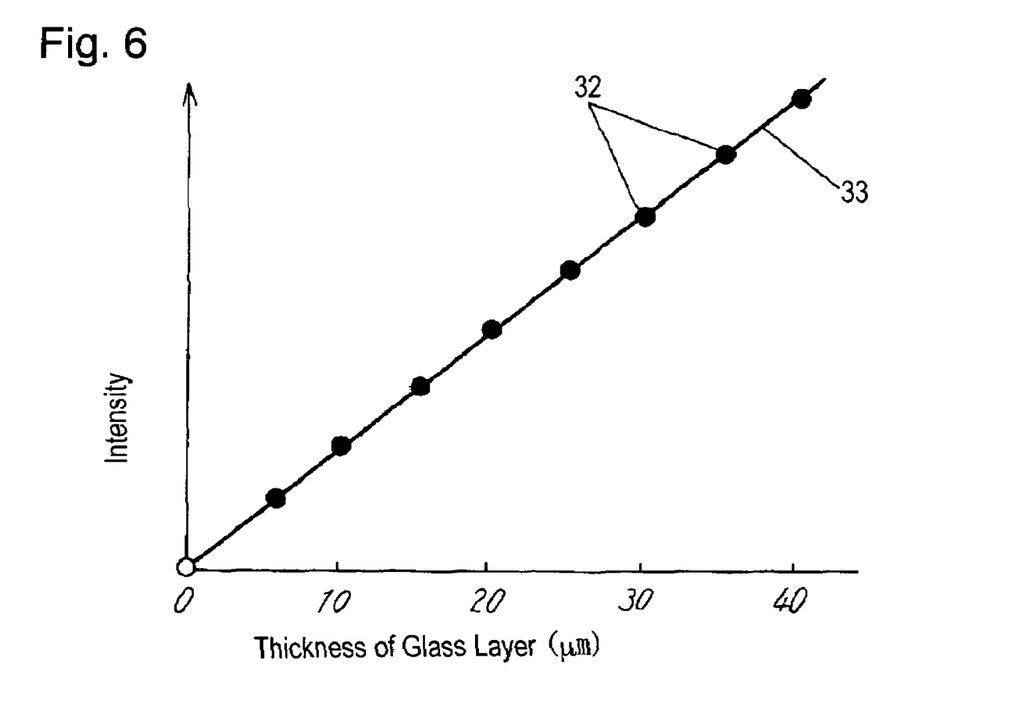
FIG. 6 illustrates a relation between the thickness of a first glass layer of the strain sensor and the intensity of fluorescent X-ray emitted onto the first glass layer.

In other words, the first glass layer 22, the second glass layer 23, and the third glass layer 24 are irradiated with the fluorescent X-ray simultaneously to the forming of the layers, thus allowing the first glass layer 22, the second glass layer 23, and the third glass layer 24 to be measured in their colors and their thicknesses. Therefore, the first glass layer 22, the second glass layer 23, and the third glass layer 24 can be formed to have predetermined thicknesses accurately.

An operation of the strain sensor manufactured by the foregoing processes and having the above arrangement will be described below, referring to relevant drawings.

The metal plate 21 is fixed to a stationary member (not shown) by fixing the first fixing aperture 25 and the second fixing aperture 26 with bolts (not shown) and nuts (not shown). Then, a detecting member (not shown) is fixed into the detecting aperture 27. Upon the detecting member being pressed from above the sensor by an external force F, the force deforms the metal plate 21. This deformation causes the first strain-sensitive resistor 29 and the third strain-sensitive resistor 34 on the metal plate 21 to receive tensioning stresses, thus increasing their resistances. At this moment, the second strain-sensitive resistor 30 and the fourth strain-sensitive resistor 36 receive compressing stresses, thus having their resistances decrease. Then, a differential voltage between the first output electrode 32 and the second output electrode 33 in the bridge circuit composed of the first strain-sensitive resistor 29, the second strain-sensitive resistor 30, the third strain-sensitive resistor 34, and the fourth strain-sensitive resistor 36 is measured with an external circuit (not shown) to determine the external force F applied to the strain sensor.

In the strain sensor according to the embodiment, the pigments are added in the first glass layer 22, the second glass layer 23, and the third glass layer 24, however may be replaced by dying agents. Before the baking of the layers, the first glass layer 22, the second glass layer 23, and the third glass layer 24 are doped with the dying agents for distinguishing the layers from each other by their colors. After the baking of the layers, the dying agents are eliminated, and the glass layers have colors substantially identical to each other. Then, the glass layers adjacent to each other have composition identical to each other. Hence, the layers have the same thermal expansion coefficients, thus providing a strain sensor having characteristics stable against a change of a temperature.

INDUSTRIAL APPLICABILITY

A strain sensor according to the present invention includes glass layers having colors different from each other, and allows the number of the glass layers to be identified while being manufactured, hence being easily controlled in its manufacturing processes.

REFERENCE NUMERALS

21 Metal Plate
22 First Glass Layer
23 Second Glass Layer
24 Third Glass Layer
28 Source Electrode
29 First Strain-Sensitive Resistor
30 Second Strain-Sensitive Resistor
31 Circuit Pattern
32 First Output Electrode
33 Second Output Electrode
34 Third Strain-Sensitive Resistor
35 GND Electrode
36 Fourth Strain-Sensitive Resistor
37 First Overcoat Glass Layer
38 Second Overcoat Glass Layer
39, 40 Fluorescent X-Ray

The invention claimed is:

1. A strain sensor comprising:
   a metal plate;
   a first glass layer provided on the metal plate;
   a second glass layer provided on the first glass layer and having a color different from a color of the first glass layer;
   an electrode provided on the second glass layer;
   a strain-sensitive resistor provided on the second glass layer;
   a circuit pattern provided on the second glass layer, for connecting the electrode with the strain-sensitive resistor; and
   an overcoat glass layer for covering the strain-sensitive resistor and the circuit pattern.

2. The strain sensor according to claim 1, wherein the first and second glass layers include pigments, respectively, the pigments being different from each other.

3. A strain sensor comprising:
   a metal plate;
   a first glass layer provided on the metal plate;
   a second glass layer provided on the first glass layer;
   an electrode provided on the second glass layer;
   a strain-sensitive resistor provided on the second glass layer;
   a circuit pattern provided on the second glass layer, for connecting the electrode with the strain-sensitive resistor; and
   an overcoat glass layer for covering the strain-sensitive resistor and the circuit pattern,
   wherein the first and second glass layers include dying agents, respectively, the dying agents allowing the first and second glass layers to have colors different from each other before being baked.

4. The strain sensor according to claim 3, wherein the first and second glass layers have colors substantially identical to each other after being baked.

5. A method of manufacturing a strain sensor, said method comprising:
- providing a first glass layer on a metal plate;
- confirming a presence of the first glass layer by identifying a color of the first glass layer;
- providing a second glass layer on the first glass layer;
- confirming a presence of the second glass layer by identifying a color of the second glass layer;
- providing an electrode and a circuit pattern over the second glass layer;
- providing a strain-sensitive resistor electrically connected to the circuit pattern; and
- providing an overcoat glass layer for covering the strain-sensitive resistor, the circuit pattern, and a portion of the second glass layer excluding positions of the electrode, the strain-sensitive resistor, and the circuit patterns.

6. The method according to claim 5, further comprising measuring the color and a thickness of the first glass layer by irradiating the first glass layer with X-ray during said providing of the first glass layer.

7. The method according to claim 5, further comprising measuring the color and a thickness of the second glass layer by irradiating the second glass layer with X-ray during said providing of the second glass layer.

8. The method according to claim 5, further comprising:
providing a third glass layer on the second glass layer; and
confirming a presence of the third glass layer by identifying a color of the third glass layer.

9. The method according to claim 8, further comprising measuring the color and a thickness of the third glass layer by irradiating the third glass layer with X-ray during said providing of the third glass layer.

* * * * *